(12) United States Patent
Gijsman et al.

(10) Patent No.: US 7,763,674 B2
(45) Date of Patent: Jul. 27, 2010

(54) HEAT STABILIZED MOULDING COMPOSITION

(75) Inventors: Pieter Gijsman, Beek (NL); Wilhelmus J. M. Sour, Maastricht (NL)

(73) Assignee: DSM IP Assets B.V., Heerlen (NL)

( * ) Notice: Subject to any disclaimer, the term of this patent is extended or adjusted under 35 U.S.C. 154(b) by 747 days.

(21) Appl. No.: 10/563,378

(22) PCT Filed: Jul. 13, 2004

(86) PCT No.: PCT/NL2004/000507

§ 371 (c)(1),
(2), (4) Date: Jan. 5, 2006

(87) PCT Pub. No.: WO2005/007727

PCT Pub. Date: Jan. 27, 2005

(65) Prior Publication Data

US 2006/0155034 A1 Jul. 13, 2006

(30) Foreign Application Priority Data

Jul. 18, 2003 (EP) .................................. 03102228

(51) Int. Cl.
*H01B 1/22* (2006.01)
(52) U.S. Cl. ........................ 524/440; 524/439
(58) Field of Classification Search .................. 524/440
See application file for complete search history.

(56) References Cited

U.S. PATENT DOCUMENTS

| | | | |
|---|---|---|---|
| 2,910,449 A | 10/1959 | Evans | |
| 4,280,935 A | 7/1981 | Ogiwara | |
| 4,538,151 A | 8/1985 | Hatakeyama et al. | |
| 4,569,789 A | 2/1986 | Blattler et al. | |
| 4,891,399 A * | 1/1990 | Ohkawa et al. | 523/200 |
| 5,280,053 A | 1/1994 | Dearlove et al. | |
| 5,492,980 A * | 2/1996 | Moriwaki | 525/429 |
| 5,604,285 A | 2/1997 | Miyamori et al. | |
| 6,350,802 B1 * | 2/2002 | Martens et al. | 524/409 |
| 6,534,564 B2 * | 3/2003 | Hanejko et al. | 523/139 |
| 6,565,938 B1 * | 5/2003 | Toyosumi et al. | 428/36.6 |
| 6,734,236 B1 * | 5/2004 | Tomihashi et al. | 524/93 |
| 7,247,366 B2 * | 7/2007 | Ogawa et al. | 428/220 |
| 2003/0027912 A1 * | 2/2003 | Tung et al. | 524/430 |
| 2003/0091823 A1 * | 5/2003 | Presenz et al. | 428/395 |

FOREIGN PATENT DOCUMENTS

| | | |
|---|---|---|
| GB | 1 357 208 | 6/1974 |
| JP | 7065754 | 10/1995 |

OTHER PUBLICATIONS

International Search Report.

* cited by examiner

*Primary Examiner*—David Wu
*Assistant Examiner*—Vu Nguyen
(74) *Attorney, Agent, or Firm*—Nixon & Vanderhye P.C.

(57) ABSTRACT

Process for preparing a moulding composition comprising melt-mixing of a thermoplastic polymer, a non-metallic inorganic filler and elementary iron having a weight average particle size of at most 450 μm to form a composition wherein the thermoplastic polymer forms a continuous phase. The invention further relates to a composition obtainable with the inventive process, the use thereof for making moulded parts, as well as to moulded parts and the use thereof in applications wherein the moulded part is exposed to elevated temperature.

18 Claims, No Drawings

HEAT STABILIZED MOULDING COMPOSITION

This application is the US national phase of international application PCT/NL2004/000507 filed 13 Jul. 2004 which designated the U.S. and claims benefit of EP 03102228.8, dated 18 Jul. 2003, the entire content of which is hereby incorporated by reference.

The invention relates to a process for preparing a moulding composition comprising a thermoplastic polymer, a fibrous reinforcing agent and a heat stabilizer in the form of a finely dispersed elementary metal and to a moulding composition obtainable by said process.

Moulding compositions based on thermoplastic materials and comprising a fibrous reinforcing agent are generally characterized by a complex property profile comprising, for the compositions as moulded, good dimensional stability, high heat distortion temperature (HDT) and good mechanical properties, such as a high tensile strength and tensile modulus. The function of a heat stabilizer is to better retain the properties of the composition upon exposure of the moulded material to elevated temperature. When moulded compositions are subjected to relatively high temperatures for a prolonged period, such as is the case with objects that serve in automotive under-the-hood applications and in several electric or electronic applications, the compositions generally tend to show a decrease in mechanical properties due to thermal degradation of the polymer. This effect is called heat ageing. In fibre reinforced polymers this effect is even more important because of the higher temperatures at which these materials are often used. The effect can than occur to an undesirable extent. In particular with glass fibre reinforced polyamides, the deteriorating effect of exposure to high temperatures can be very dramatic. In many applications for thermoplastic moulding compositions, retention of mechanical properties after long-term exposure to temperatures as high as 160° C., or even 180° C.-200° C. and higher, becomes a basic requisite. The number of specialty applications, requiring compositions with improved heat ageing properties is also increasing. When using a heat stabilizer, the useful lifetime of the moulded material can be extended significantly, depending on the type of material, use conditions and type and amount of heat stabilizer. Examples of heat stabilizers typically used in, for example, polyamides are organic stabilizers, like phenolic antioxidants and aromatic amines, and copper, either in the form of a copper salt in combination with potassium iodide or potassium bromide, or in the form of elementary copper. Phenolic antioxidants and aromatic amines are generally used for stabilisation at elevated temperatures up to about 130° C. Copper containing stabilizers are suitable for stabilisation at higher temperatures and have been available for many years.

A moulding composition comprising a thermoplastic polymer, a fibrous reinforcing agent and a copper based heat stabilizer is known from DE-A-4305166. The thermoplastic polymer in the known composition is an aliphatic or aromatic polyamide. As the fibrous reinforcing agent glass fibres are used. As the heat stabilizer in the known composition, both copper iodide/potassium iodide and in-situ formed finely dispersed elementary copper are mentioned.

The copper iodide/potassium iodide containing composition was formed by a compounding process comprising simply melt-mixing of the constituting components of the composition. A disadvantage of this composition is that the heat ageing performance is limited and far from sufficient for many applications. The composition comprising elementary copper is said to have a much better resistance against thermal oxidation and influence of light than the copper salt/potassium iodide containing composition. The composition comprising elementary copper was formed by a compounding process, wherein the polyamide and glass fibres were melt-mixed with an ionic or complex copper stabilizer and a reducing agent, and wherein the elementary copper was formed in-situ. Such an in-situ preparation process is not very practical, since one has to combine several components, which have to react with each other during the compounding process, while the outcome of such a process is very sensitive to variations in the ratio of mixed components and process conditions. It would have been much more practical if the composition could have been prepared by straight-forward melt-mixing of the constituting components. However, as according to DE-A-4305166, the finely dispersed elementary copper is only effective as a heat stabiliser when it is prepared in-situ. When elementary copper prepared in advance of the melt-mixing process, in casu colloidal copper, was used in a melt-mixing process for preparing a heat stabilised composition, the heat ageing performance of that composition was not essentially better than that of the copper iodide/potassium iodide containing composition, as noted in DE-A-4305166.

The object of the invention is to provide a process which allows for the preparation of a fibre reinforced, heat stabilized moulding composition having a better heat ageing performance than the known copper iodide/potassium iodide containing composition, and which process does not have the disadvantage as that of the known process for preparing the composition comprising finely dispersed elementary copper.

This object has been achieved by the process according to the invention in that it comprises melt-mixing of a thermoplastic polymer, a non-metallic inorganic filler and elementary iron powder having a weight average particle size of at most 450 μm to form a composition wherein the thermoplastic polymer forms a continuous phase.

Surprisingly, elementary iron in the specified size range has been shown to be a very effective heat stabilizer, while this heat stabilizing effect can be achieved even by a process according to the invention which does not require in-situ preparation of the finely dispersed elementary iron, but involves simply melt-mixing of elementary iron having the specified particle size with the other components of the composition. The effect of the process according to the invention is that the moulding composition prepared with said process comprising finely dispersed elementary iron shows a remarkable improvement in heat ageing properties, exhibited by a much better retention of the mechanical properties at elevated temperature, in respect of the known copper salt/potassium iodide containing compositions as well as in respect of the known elementary copper containing compositions prepared by melt-mixing of a thermoplastic polymer, fibrous reinforcing agent and elementary copper. A further advantage of the process according to the invention is that it allows more flexibility in the production process for preparing the heat stabilised compositions compared to the known process comprising the in-situ preparation of the composition comprising finely dispersed elementary copper. It has been found that the composition according to the invention can be prepared by a standard melt-mixing processes comprising melt-mixing of the thermoplastic polymer, the fibrous reinforcing agent and elementary iron in a suitable form, such as in the form of a masterbatch of finely dispersed elementary iron in a carrier polymer.

A composition comprising a thermoplastic polymer and finely dispersed elementary iron is known from U.S. Pat. No. 5,153,038. The known composition according U.S. Pat. No. 5,153,038 is used for making packaging materials having oxygen barrier properties, such as multi-layer foils and vessels for food. The thermoplastic polymer that is used in the said composition is typically a polymer having a low oxygen permeation coefficient. The known composition further generally comprises a deliquescent substance, such as a deliquescent inorganic salt, a deliquescent organic compound or a highly water absorbing resin. U.S. Pat. No. 5,153,038 does neither describe compositions comprising a fibrous reinforcing agent or moulded articles thereof, nor the good heat ageing properties as according to the present invention.

Finely dispersed elementary iron is understood herein to be elementary iron dispersed, in the form of small particles having a weight average particle size of at most 450 μm, in a continuous medium. The continuous medium forms a continuous phase and can be, for example, a thermoplastic polymer or a carrier polymer.

Elementary iron having a small particle size is understood herein to be elementary iron present in the form of particles, the majority of which having a small particle size, such as a powder. In general, the elementary iron has a weight average particle size of at most 450 μm, preferably at most 250 μm. It is further preferred that the elementary iron having a small particle size has a weight average particle size of at most 200 μm, more preferably at most 100 μm, and still more preferably at most 50 μm. The elementary iron may have a very small particle size with a weight average particle size of, for example, 10 or 5 μm and even lower. The advantage of a lower weight average particle size of the elementary iron, the more effective the elementary iron is as a heat stabiliser.

The weight average particle size is determined as $D_m$ according to ASTM standard D1921-89, method A. Preferably the size, to be understood as the largest dimension, of at least 50 wt % of the elementary iron particles is at most 450 μm and preferably at most 250 μm, more preferably at most 200 μm, even more preferably at most 100 μm and still more preferably at most 50 μm. More preferably the size of at least 75 or even 90 wt % of the iron particles satisfies said preferences.

Suitable elementary iron, that can be used in the process according to the invention, is, for example, SCM Iron Powder A-131, available form SMC Metal Products, Ohio.

The elementary iron in the process according to the invention can be used in an amount, which can be varied over a wide range. The elementary iron has shown to be a very effective stabiliser, showing an effect already at very low amounts. Practically, the elementary iron can be used in an amount of at least 0.01 parts by weight (further herein abbreviated as "pbw"), relative to 100 pbw of thermoplastic polymer. More preferably the amount is at least 0.1 pbw, still more preferably at least 1.0 pbw, and most preferably at least 2.0 pbw, relative to 100 parts by weight of thermoplastic polymer. The advantage of a higher amount of elementary iron, relative to the weight of the thermoplastic polymer, is that the composition has better heat-ageing properties.

On the other hand the amount may be as high or even higher than 20 parts by weight, relative to 100 parts by weight of thermoplastic polymer. However, with 5 to 10 pbw relative to 100 parts by weight of thermoplastic polymer already such good heat aging properties are obtained that use of a higher amount brings relative little improvement.

The thermoplastic polymer that can be used in the process according to the invention, and in the composition obtainable by said process, may be any type of thermoplastic polymer suitable for use in reinforced moulding compositions for applications involving exposure to elevated temperature. The thermoplastic polymer can be, for example, an amorphous polymer or a semi-crystalline polymer. The thermoplastic polymer may optionally also be a thermoplastic elastomer, or a crystalline polymer, such as a liquid crystalline polymer.

Generally, the thermoplastic polymer used for preparing compositions intended for high temperature applications is a semi-crystalline or crystalline polymer or a thermoplastic elastomer, having a melting temperature of at least 180° C., or an amorphous polymer having a glass transition temperature of at least 180° C.

Preferably, the thermoplastic polymer in the composition according to the invention has a melting temperature, or where the thermoplastic polymer is an amorphous polymer a glass transition temperature, of at least 200° C., more preferably of at least 220° C., still more preferably of at least 240° C. The advantage of the process according to the invention, in which the said melting temperature or glass transition temperature of the thermoplastic polymer is higher, is that the heat distortion temperature (HDT) of the composition, resulting of said process, is higher and that the effect of the elementary iron on the heat-ageing properties at the temperature corresponding with said higher HDT is more emphasized, allowing a further increase in the maximum use temperature for the composition.

Suitable amorphous polymers that can be used in the process and the composition according to the invention are, for example, polyimides (PI) polyethersulfones (PES), polyetherimides (PEI), polysulfones (PSU), polyarylates (PAR), and amorphous polyamides.

Suitable semi-crystalline polymers are, for example, polyetheretherketones (PEEK), semi-crystalline polyamides, polyphenylesulfides (PPS), and polyesters, such as polycyclohexyldimethyltherephthalate (PCT), polyethylenetherephthalate (PET) and polybuthylenetherephthalate (PBT)

The thermoplastic polymer may also comprise a blend of different thermoplastic polymers.

Preferably, the thermoplastic polymer is a polyester or a polyamide (PA), more preferably a polyamide. The advantage of the process according to the invention wherein the thermoplastic polymer is a polyamide is that fibre reinforced polyamides suffer very much from the deteriorating effect of exposure to high temperature, and that this effect is reduced by large when combined with elementary iron as according to the invention.

Suitable polyamides that can be used in the process according to the invention, and in the composition obtainable by said process, are, for example, aliphatic polyamides, semi-aromatic polyamides and mixtures thereof.

Suitable aliphatic polyamides are, for example, PA-6, PA-11, PA-12, PA-4,6, PA-4,8, PA-4,10, PA-4,12, PA-6,6, PA-6,9, PA-6,10, PA-6,12, PA-10,10, PA-12,12, PA-6/6,6-copolyamide, PA-6/12-copolyamide, PA-6/11-copolyamide, PA-6,6/11-copolyamide, PA-6,6/12-copolyamide, PA-6/6,10-copolyamide, PA-6,6/6,10-copolyamide, PA-4,6/6-copolyamide, PA-6/6,6/6,10-terpolyamide, and copolyamides obtained from 1,4-cyclohexanedicarboxylic acid and 2,2,4- and 2,4,4-trimethylhexamethylenediamine, and copolyamides of the aforementioned polyamides.

Suitable semi-aromatic polyamides are, for example, PA-6,I, PA-6,I/6,6-copolyamide, PA-6,T, PA-6,T/6-copolyamide, PA-6,T/6,6-copolyamide, PA-6,I/6,T-copolyamide, PA-6,6/6,T/6,I-copolyamide, PA-6,T/2-MPMD,T-copolyamide (2-MPMD=2-methylpentamethylene diamine), PA-9,T, PA-9T/2-MOMD,T (2-MOMD=2-methyl-1,8-octamethylenediamine), copolyamides obtained from terephthalic acid, 2,2,4- and 2,4,4-tri-methylhexamethylenediamine, copolyamide obtained from isophthalic acid, laurinlactam and 3,5-dimethyl-4,4-diamino-dicyclohexylmethane, copolyamides obtained from isophthalic acid, azelaic acid and/or sebacic acid and 4,4-diaminodicyclohexylmethane, copolyamides obtained from caprolactam, isophthalic acid and/or terephthalic acid and 4,4-diaminodicyclohexylmethane, copolyamides obtained from caprolactam, isophthalic acid and/or terephthalic acid and isophoronediamine, copolyamides obtained from isophthalic acid and/or terephthalic acid and/or other aromatic or aliphatic dicarboxylic acids, optionally alkyl-substituted hexamethylenediamine and alkyl-substituted 4,4-diaminodicyclohexylamine, and copolyamides of the aforementioned polyamides.

Preferably polyamides are chosen from the group consisting of PA-6, PA-6,6, PA-6,10, PA-4,6, PA-11, PA-12, PA-12,12, PA-6,I, PA-6,T, PA-6,I6,T-copolyamide, PA-6,T/6,6-copolyamide, PA-6,T/6-copolyamide, PA-6/6,6-copolyamide, PA-6,6/6,T/6,I-copolyamide, PA-6,T/2-MPMD,T-copolyamide, PA-9,T, PA-9T/2-MOMD,T-copolyamide, PA-4,6/6-copolyamide and mixtures and copolyamides of the aforementioned polyamides. More preferably PA-6,I, PA-6,T, PA-6,I/6,T-copolyamide, PA-6,6, PA-6,6/6T, PA-6,6/6,T/6,I-copolyamide, PA-6,T/2-MPMD,T-copolyamide, PA-9,T, PA-9T/2-MOMD,T-copolyamide or PA-4,6, or a mixture or copolyamide thereof, is chosen as the polyamide.

The polyamide may optionally contain modified end groups, for example amine end groups modified with a monocarboxylic acid and/or carboxylic acid end groups modified with a mono-functional amine. Modified end-groups in the polyamide may advantageously be applied for improved melt-stability of the composition during its preparation by melt mixing or during a moulding process of said composition.

In a preferred embodiment of the process according to the invention, the thermoplastic polymer is a blend of a semicrystalline polyamide having a melting point of at least 260° C. and a second polyamide having a melting temperature less than 260° C., or, where the second polyamide is an amorphous polyamide, having a glass transition temperature less than 260° C.

The fibrous reinforcing agent that can be used in the process according to the invention, and in the composition obtainable by said process, may be any type of non-metallic fibrous reinforcing agent suitable for use in fibre reinforced thermoplastic compositions for use in high temperature applications. A fibrous reinforcing agent is considered herein to be a material having length, width and thickness, wherein the average length is significantly larger than both the width and thickness. Generally, such a material has an aspect ratio UD, defined as the average ratio between the length (L) and the largest of the width and thickness (D) of at least 5. Preferably, the aspect ratio of the fibrous reinforcing agent is at least 10, more preferably at least 20, still more preferably at least 50.

Suitable non-metallic fibrous reinforcing agents that can be used in the process according to the invention, and in the composition obtainable with said process, are, for example, glass fibres, carbon or graphite fibres, aramide fibres, ceramic fibres, mineral fibres, such as wollastonite, and whiskers. Preferably, glass fibres are chosen. Metallic fibers such as copper, iron and aluminium fibres are not preferred in the process and composition according to the invention in view of the application field envisaged for the composition.

The amount of fibrous reinforcing agent that is used in the process according to the invention can be varied over a large range. Generally that amount ranges from 5 to 300 parts by weight (pbw) relative to 100 pbw thermoplastic polymer. Preferably, the amount is 10-235 pbw, more preferably 15-150 pbw, relative to 100 pbw thermoplastic polymer.

The process according to the invention can be carried out by any known melt-mixing process that is suitable for preparing fibre-reinforced thermoplastic moulding compositions. Such a process is typically carried out by heating the thermoplastic polymer above the melting temperature or in case the thermoplastic polymer is an amorphous polymer above the glass transition temperature, of the thermoplastic polymer thereby forming a melt of the thermoplastic polymer.

The process according to the invention can be carried out in a melt-mixing apparatus, for which any melt-mixing apparatus known to the man skilled in the art of preparing polymer compositions by melt mixing can be used. Suitable melt-mixing apparatus are, for example, kneaders, Banbury mixers, single-screw extruders and twin-screw extruders. Preferably, use is made of an extruder fitted with means for dosing all the desired components to the extruder, either to the extruder's throat or to the melt.

In the process according to the invention the constituting components for forming the composition are fed to the melt-mixing apparatus and melt-mixed in that apparatus. The constituting components may be fed simultaneously as a powder mixture or granule mixer, also known as dry-blend, or may be fed separately.

The process according to the invention is not limited in the way the elementary iron is added. It may be added, for example, as a powder, a dry-blend or premix comprising the thermoplastic polymer in granulate form and the elementary iron in powder form, or as a masterbatch of finely dispersed elementary iron in a carrier polymer.

Advantageously, the elementary iron is added in the form of a masterbatch, since this allows a better control of the dosing accuracy of the elementary iron when the elementary iron is added in small quantities relative to the thermoplastic polymer. Another advantage of the use of a masterbatch is that it is easier to obtain a homogenous blend of the elementary iron and the thermoplastic polymer. A further advantage is that addition of the elementary iron in the form of a masterbatch results in a safer process, since elementary iron in powder form is sensitive to oxidation in air and is often highly flammable.

The carrier polymer that can be used in the masterbatch may be the same as the thermoplastic polymer, as well as another polymer, such a lower melting thermoplastic polymer, an elastomer or a rubber.

In a preferred embodiment, the carrier polymer is the same polymer or it is a polymer having a melting temperature, or a glass transition temperature in case the carrier polymer is an amorphous polymer, close to the melting temperature of the thermoplastic polymer, or, in case the thermoplastic polymer is an amorphous polymer, close to the glass transition temperature of the thermoplastic polymer. This has the advantage that the melt-mixing process can be carried out with limited modification, if any, of the processing temperature needed for the thermoplastic polymer. Another advantage is that the heat distortion temperature (HDT) and/or the maximum continuous use temperature of the resulting composition are better retained.

More preferably, the carrier polymer is the same polymer as the thermoplastic polymer. The advantage thereof is maximum compatibility between carrier polymer and thermoplastic polymer.

In another preferred embodiment, the carrier polymer is an elastomer or a rubber. This has the advantage that the composition obtainable with the process according to the invention has improved impact resistance, while the need for adding a separate impact modifier is reduced or can be avoided completely.

Suitable rubbers that can be used as the carrier polymer are for example, SBS rubber and EPDM rubber.

The carrier polymer may also advantagely be a thermoplastic polymer, more particularly a thermoplastic polymer with a low melting temperature. Suitable low melting thermoplastic polymers that can be used as a carrier polymer are, for example, polyethylene (PE), polypropylene (PP), and PE/PP copolymers.

The masterbatch of elementary iron finely dispersed in a carrier polymer may be prepared, for example, by adding elementary iron powder having a small average particle size, to a melt of a carrier polymer in a melt-mixing apparatus, such as an extruder.

A masterbach of elementary iron finely dispersed in a carrier polymer, suitable for use in the process according to the invention is, for example, Shelfplus O2 2400, ex Ciba, Switzerland.

The masterbatch of elementary iron that is used in a preferred embodiment of the process according to the invention preferably has a iron content of at least 5 mass %, more preferably at least 10 mass %, relative to the mass of the masterbatch. The advantage of a higher iron content in the masterbatch is that for arriving at the same iron content in the composition, the composition can be prepared with a lower carrier polymer content, thereby better retaining the properties imparted by the thermoplastic polymer.

In the final composition obtained by the process according to the invention the thermoplastic polymer forms a continuous phase in which the other components are present as a dispersed phase.

The invention also relates to a moulding composition comprising a thermoplastic polymer as a continuous phase, a non-metallic fibrous reinforcing agent and finely dispersed elementary iron having a weight average particle size of at most 450 µm. The moulding composition according to the invention is obtainable by the process according to the invention. The advantage of the inventive composition is that it shows a remarkable improvement in heat ageing properties, exhibited by a much better retention of the mechanical properties at elevated temperature, in respect of the known copper salt/potassium iodide containing compositions as well as in respect of the known elementary copper containing compositions prepared by melt-mixing of a thermoplastic polymer, fibrous reinforcing agent and elementary copper while containing the same mass % of heat stabilizer, relative to the total mass of the composition. Another advantage is that the composition can be prepared with a lower mass % of heat stabilizer, relative to the total mass of the composition, to achieve the same level of heat ageing properties.

Preferred embodiments of the composition according to the invention directly relate to preferred embodiments of the process according to the invention and specific components used therein, as described above, and the reported advantages thereof.

Preferably, the composition according to the invention contains a. 100 pbw thermoplastic polymer, b. 5-300 pbw of the fibrous reinforcing agent, c. 0.01-20 pbw of the finely dispersed elementary iron and d. 0-30 pbw of a carrier polymer, wherein "pbw" means "parts by weight".

The composition according to the invention may also contain fillers and other additives, both non-fibrous and non metallic, known to a person skilled in the art that are customarily used in polymer compositions, providing they do not essentially detract from the invention. These other additives which may optionally be comprised by the composition according to the invention, include pigments, processing aids, for example mould release agents, nucleating agents or agents accelerating crystallization, UV stabilizers and antioxidants, flame-retardants, impact modifiers and compatibilizers. A compatibilizer is advantageously used in combination with carrier polymer having low compatibility with the thermoplastic polymer. The other additives in particular include substances that further promote the heat ageing properties, such as, for example, inorganic salts, acidifying components and mixtures thereof. Examples of suitable inorganic salts include alkali, alkaline earth and transition metal halides, sulphates, nitrates, carbonates, carboxylates, sulphites and phosphates, such as sodium chloride, potassium bromide, potassium iodide, calcium carbonate, magnesium sulphate, cupric nitrate, cupric iodide, cupric acetate and mixtures thereof. Suitable acidifying component are, for example, sodium-phosphor buffers, such as sodium pyrophosphate.

In particular, the composition according to the invention contains an inorganic filler. Suitable as inorganic filler are all the non-metallic and non-fibrous, inorganic fillers known to a person skilled in the art, for example glass beads, aluminium silicates, mica, clay, calcined clay and talcum.

The composition according to the invention preferably consists of a. 94.95-25 mass % thermoplastic polymer, b. 5-70 mass % fibrous reinforcing agent, c. 0.05-16 mass % finely dispersed elementary iron, d. 0-16 mass % carrier polymer, e. 0-69.95 mass % an inorganic filler, f. 0-16 mass % at least one other additive, wherein the mass % are relative to the total mass of the composition, the total amount of (b+c+e) is at most 75 mass %, relative to the total mass of the composition, the total amount of (d+f) is at most 30 mass %, relative to the total amount of (a+d+f), and the total amount of (a+b+c+d+e+f) is equal to 100 mass %.

More preferably, the composition consists of a. 94.95-30 mass % thermoplastic polymer, b. 5-60 mass % fibrous reinforcing agent, c. 0.10-10 mass % finely dispersed elementary iron, d. 0-10 mass % carrier polymer, e. 0-59.90 mass % inorganic filler, f. 0-10 mass % of the at least one other additive, wherein the mass % are relative to the total mass of the composition, the total amount of (b+c+e) is at most 65 mass %, relative to the total mass of the composition, the total amount of (d+f) is at most 20 mass %, relative to the total amount of (a+d+f) and the total amount of (a+b+c+d+e+f) is equal to 100 mass %.

Where the composition according to the invention comprises a filler, said filler is generally present in an amount of at least 0.01 mass %, preferably at least 1 mass %, and still more preferably at least 10 mass % relative to the total mass of the composition. The advantage of the composition having a higher filler content is that the product has a better dimensional stability, a higher HDT and less warpage.

Where the composition according to the invention comprises another additive, said additive is generally present in an amount of at least 0.01 mass %, preferably at least 0.1 mass %, and still more preferably at least 1 mass % relative to the total mass of the composition.

For preparing the composition according to the invention also comprising a filler and/or an other additive standard melt-mixing processes can be used. The filler and/or additive may be added in the process for preparing the said composition in the same melt-mixing step in which the elementary iron and the thermoplastic polymer are melt-mixed or in a separate melt-mixing step. Preferably, the filler and/or additive are melt-mixed with the thermoplastic polymer in the same step in which the elementary iron is melt-mixed with said polymer.

The invention provides for thermoplastic polymer composition, wherein the thermoplastic polymer is an aliphatic polyamide, having a HDT, measured according ISO 75/A, of at least 220° C., and having a tensile strength and/or elongation at break, tested on a test bar with a thickness of 4 mm in a tensile test according to ISO 527 at 23° C., which is retained for at least 60% after heat-ageing for 800 hours at 215° C.

For the sake of clarity it is mentioned that the HDT is measured on a moulded part made of said composition, and that the tensile test is measured on another moulded part made of the same composition Preferably, the said mechanical property of the composition is retained for at least 70% after heat ageing for 800 hours at 215° C.

The invention also provides for thermoplastic polymer composition, wherein the thermoplastic polymer is a semi-aromatic polyamide, having a HDT, measured according ISO 75/A, of at least 250° C., and having a tensile strength and/or elongation at break, tested on a test bar with a thickness of 4 mm in a tensile test according to ISO 527 at 23° C., which is retained for at least 50% after heat-ageing for 800 hours at 230° C.

Preferably, the said mechanical property of the composition is retained for at least 60%, more preferably, at least 70% after heat-ageing for 800 hours at 215° C.

Preferably, the thermoplastic polymer in the thermoplastic polymer composition having the good retention of tensile strength and/or elongation at break, tested after heat ageing, is a polyester or a polyamide, more preferably a polyamide.

The advantage of the thermoplastic polymer composition having the good retention of tensile strength and/or elongation at break, tested after heat ageing, is that it can be used for moulded parts and applications of moulded parts made thereof, wherein the moulded part has an extended life-time or can be used at higher temperature, than a moulded part not having such good retention of mechanical properties after heat ageing. A further advantage is that the thermoplastic polymer composition having the good retention of tensile strength and/or elongation at break can be used at a higher continuous use temperature, and/or that it can be used for a longer time at the same continuous use temperature.

The invention also relates to the use of a composition according to the invention for the preparation of a moulded part, as well as to a moulded part comprising a composition according to the invention. The advantage of the moulded part according to the invention is that it has very good heat ageing properties.

The moulded part can have a primarily 2-dimensional shape, such as for engine covers. The moulded may also have a more complex 3-dimensional shape, as is the case for many parts used in high temperature applications.

Generally, the part has a thickness of at least 0.5 mm, though the parts may have a lower thickness as well. Preferably, the part has a thickness of at least 1 mm, more preferably at least 2 mm, and still more preferably at least 4 mm. The advantage of the part having a higher thickness is that the mechanical properties are better retained under heat ageing conditions at elevated temperature.

More particular, the moulded part is a moulded part for use in machines and engines, which can be applied, for example, in automotive vehicles, such as personal cars, motor bikes, trucks and vans, general transport means, including trains, aviation and ships, domestic appliances, such as lawn mowers and small engines, and general industry installations, such as in pumps, compressors, conveyor belts, or a moulded part for use in electric and electronic installations, such as in domestic power tools and portable power equipment.

The part may be, for example, a bearing, a gear box, an engine cover, an air duct, an intake manifold, an intercooler end-cap, a castor, or a trolley part.

The invention also relates to the use of a moulded part according to the invention in engines, machines, electric and electronic installations, and further to engines, machines and assembled articles comprising a moulded part according to the invention.

The invention furthermore relates to products, including automotive vehicles, general transport means, domestic appliances, and general industry installations, electric and electronic installations, comprising a moulded part according to the invention. The advantage is that the service life time of the said products in respect of the necessary replacement of the said moulded part due to deterioration of the moulded part by exposure to elevated temperature is longer, and/or that the product can be operated at higher temperature, compared with a corresponding product comprising a moulded part made of the known composition comprising a copperiodide/potassium iodide stabilizing system.

The invention is further illustrated with the following examples and comparative experiments.

Materials

PA-6-No. 1 Polyamide 6, type K122, viscosity number 115 ml/g (measured according to ISO 307) (ex DSM, The Netherlands)

PA-6-No. 2 Polyamide 6, type K123, viscosity number 129 ml/g (measured according to ISO 307), (ex DSM, The Netherlands)

PA-6,6 Polyamide-6,6, type S222, viscosity number 115 ml/g (measured according to ISO 307), (ex DSM, The Netherlands)

PA-4,6 Polyamide-4,6, type KS 200, viscosity number 160 ml/g (measured according to ISO 307), (ex DSM, The Netherlands PA-6,6/6,T Polyamide-6,6/6,T, type FE5011, (ex EMS, Switzerland)

Compatiblizer-I Maleic anhydride modified polyethylene (ex DSM, The Netherlands)

Reinforcing agent Glass fibres: standard type for polyamides

Elementary iron masterbatch Masterbatch containing 20 mass % of iron particles, average particle size 30 µm, in PE.

Stabilizing aid A Iodide stabilizer 201 (Copper Iodide/Potassium iodide in a stearate (80/10/10) (ex Ciba, Switzerland)

Stabilizing aid B Copper iodide (CuI) (ex DSM Minera BV, . . . )

Stabilizing aid C Potassium Iodide (KI) (ex DSM Minera BV)

Processing aid Acrawax C (lubricant) (ex Lonza, Italy)

Amodel AS1133HS Semi-aromatic polyamide composition, PA-6,6/6,T/6,1, glass content 33 mass %, black colour, ex Solvay Amodel AS1145HS Semi-aromatic polyamide composition, PA-6,6/6,T/6,1, glass content 45 mass %, black colour, ex Solvay Amodel AS4145HS Semi-aromatic polyamide composition, PA-6,6/6,T, glass content 45 mass %, natural colour, ex Solvay Grivory HTV 5H1 Semi-aromatic polyamide composition, PA-6,T/6,1, glass content 50 mass %, natural colour, ex EMS Zytel HTN51 G35 HSL Semi-aromatic polyamide composition, PA-6,T/2-MPMD,T, glass content 35 mass %, natural colour, ex Du Pont Zytel HTN52G35 HSL Semi-aromatic polyamide composition PA-6,6/6,T, glass content 35 mass %, natural colour, ex Du Pont

EXAMPLE I AND COMPARATIVE EXPERIMENT A

The compositions of Example I and Comparative Experiment A were prepared using a ZSK 25 twin-screw extruder (ex Werner & Fleiderer). The cylinder temperature of the extruder was 260° C., rotation speed of the screws 275 RPM and the throughput 20 kg/hour. All ingredients except the reinforcing agent were added via a hopper at the throat. The reinforcing agent was added to the melt by side dosing. The compounded material was extruded in the form of strands, cooled in a water bath and cut into granules. The resulting granulate was dried for 16 hours at 105° C. under vacuum.

The dried granulate was injection moulded on an injection moulding machine type 75 (ex Engel) with a screw diameter of 22 mm in the form of test bars with a thickness of 4 mm and conforming ISO 527 type 1A. The temperature of the melt in the injection moulding machine was 280° C.; the temperature of the mould was 80° C.

The test bars were heat-aged in a GRENCO oven (type: GTTS 125 00 S) at 215° C. After a certain heat ageing time, the test bars were taken out the oven, left to cool to room temperature and tested with respect to the mechanical properties by means of a tensile test according ISO 527 at 23° C.

The compositions and typical test results for Example I and Comparative Experiment A have been collected in Table 1.

TABLE 1

Composition and typical test results for Example I and Comparative Experiment A

| | amount (mass %) | |
|---|---|---|
| | Example I | Comparative Experiment A |
| Composition component | | |
| PA-6-No-1 | 62.79 | 69.46 |
| Compatibiliser | 1.67 | — |
| Reinforcing agent | 30 | 30 |
| Elementary iron masterbatch | 5 | — |
| Stabilising aid | 0.24 | 0.24 |
| Release agent | 0.30 | 0.30 |
| Mechanical properties Initial | | |
| Tensile strength [Mpa] | 163 | 184 |
| Elongation at break [%] | 2.66 | 3.51 |
| after 800 hours at 215° C. | | |
| Tensile strength [Mpa] | 185 | 92 |
| Elongation at break [%] | 3.61 | 1.02 |

EXAMPLE II AND COMPARATIVE EXPERIMENT B

The compositions of Example II and Comparative Experiment B and test bars made thereof were prepared analogous to those of Example I and Comparative Experiment A, except that for compounding the cylinder temperature of the extruder was 280° C., while for injection moulding the temperature of the melt was 290° C. Heat ageing was carried out at 230° C. The compositions and typical test results for Example II and Comparative Experiment B have been collected in Table II.

TABLE II

Composition and typical test results for Example II and Comparative Experiment B

| | amount (mass %) | |
|---|---|---|
| | Example II | Comparative Experiment B |
| Composition component | | |
| PA-6,6 | 62.79 | 69.46 |
| Compatibiliser | 1.67 | |
| Reinforcing agent | 30 | 30 |
| Elementary iron masterbatch | 5 | — |
| Stabilising aid | 0.24 | 0.24 |
| Release agent | 0.30 | 0.30 |
| Mechanical properties Initial | | |
| Tensile modulus [Mpa] | 9000 | 9200 |
| Tensile strength [Mpa] | 162 | 193 |
| Elongation at break [%] | 2.44 | 3.4 |
| after 800 hours at 230° C. | | |
| Tensile modulus [Mpa] | 7900 | 475 |
| Tensile strength [Mpa] | 115 | 1 |
| Elongation at break [%] | 2.14 | 0.27 |

EXAMPLE III AND COMPARATIVE EXPERIMENT C

The compositions of Example III and Comparative Experiment C and test bars made thereof were prepared analogous to those of Example I and Comparative Experiment A, except that for compounding the cylinder temperature of the extruder was 310° C., while for injection moulding the temperature of the melt was 315° C., whereas the temperature of the mould was 120° C. Heat ageing was carried out at 230° C. The compositions and typical test results for Example III and Comparative Experiment C have been collected in Table 3.

TABLE 3

Composition and typical test results for Example III and Comparative Experiment C

| | amount (mass %) | |
|---|---|---|
| | Example III | Comparative Experiment C |
| Composition component | | |
| PA-4,6 | 62.31 | 69.48 |
| PA-6-No. 2 | 0.5 | — |
| Compatibiliser | 1.67 | — |
| Reinforcing agent | 30 | 30 |

TABLE 3-continued

Composition and typical test results for
Example III and Comparative Experiment C

|  | amount (mass %) | |
|---|---|---|
|  | Example III | Comparative Experiment C |
| Elementary iron masterbatch | 5 | — |
| Stabilising aid B | 0.05 | 0.05 |
| Stabilising aid C | 0.47 | 0.47 |
| Release agent | 0.30 | 0.30 |
| Mechanical properties Initial | | |
| Tensile modulus [Mpa] | 9700 | 9500 |
| Tensile strength [Mpa] | 188 | 203 |
| Elongation at break [%] | 2.54 | 3.07 |
| after 800 hours at 230° C. | | |
| Tensile modulus [Mpa] | 9360 | 2230 |
| Tensile strength [Mpa] | 81.3 | 12 |
| Elongation at break [%] | 0.94 | 0.54 |

EXAMPLE IV

The composition of Example IV and test bars made thereof were prepared analogous to those of Example I, except that for compounding the cylinder temperature of the extruder was 300° C., while for injection moulding the temperature of the melt was 335° C., whereas the temperature of the mould was 140° C. Heat ageing was carried out at 230° C. The composition and typical test results for Example IV have been collected in Table 4.

TABLE 4

Composition and typical test results for Example IV.

| | amount (mass %) Example IV |
|---|---|
| Composition component | |
| PA-6,6/6,T | 62.29 |
| Compatibiliser | 1.67 |
| Reinforcing agent | 30 |
| Elementary iron masterbatch | 5 |
| Stabilising aid B | 0.1 |
| Stabilising aid C | 0.94 |
| Mechanical properties Initial | |
| Tensile strength [Mpa] | 197 |
| Elongation at break [%] | 2.4 |
| after 800 hours at 230° C. | |
| Tensile strength [Mpa] | 134 |
| Elongation at break [%] | 1.45 |

COMPARATIVE EXAMPLES D-I

For the comparative experiments D-I commercially available semi-aromatic polyamide compositions were used. From these compositions test bars were prepared by injection moulding analogous to Example IV, except that the settings for the melt temperature and mould temperature were adapted as reported in Table 5. Heat ageing was carried out at 230° C., as for. Example IV The composition and typical test results for Comparative Experiments D-I have also been collected in Table 5.

TABLE 5

Comparative Examples D–I: Mechanical properties before and after heat ageing for 800 hours at 230

| Comparative Experiment | Material | Glass fibre content (mass %) | Melt temperature [° C.] | Mould temperature [° C.] | Tensile strength [Mpa] Before ageing | Elongation at break [%] Before ageing | Tensile strength [Mpa] After ageing | Elongation at break [%] After ageing |
|---|---|---|---|---|---|---|---|---|
| D | Amodel AS1133HS | 33 | 335 | 140 | 194 | 2.3 | 76 | 0.85 |
| E | Amodel AS1145HS | 45 | 335 | 140 | 221 | 2.2 | 84 | 0.8 |
| F | Amodel AS4145HS | 45 | 340 | 80 | 220 | 2.4 | 89 | 0.79 |
| G | Grivory HTV 5H1 | 50 | 335 | 140 | 266 | 2.4 | 68 | 0.49 |
| H | Zytel HTN 51G35 HSL | 35 | 335 | 150 | 217 | 2.6 | 71 | 0.84 |
| I | Zytel HTN 52G35 HSL | 35 | 335 | 95 | 225 | 2.7 | 80 | 1.0 |

Comparison of the results of Table 4 and 5 show that the composition according to the invention, in casu Example IV, has a much higher tensile strength as retained after ageing than the comparative compositions according to Comparative Examples D-I, even despite the fact that the glass content of the Comparative Examples is higher than the glass content of Example IV.

The invention claimed is:

1. Process for preparing a moulding composition comprising melt-mixing a thermoplastic polymer, a non-metallic fibrous reinforcing agent and elementary iron having a weight average particle size of at most 450 μm to form a composition, wherein the thermoplastic polymer forms a continuous phase and is a semi-crystalline or crystalline polymer having a melting temperature of at least 180° C. or an amorphous polymer having a glass transition temperature of at least 180° C., and wherein the elementary iron is present in the composition in an amount between 0.01 to 20 parts by weight (pbw) relative to 100 pbw of the thermoplastic polymer.

2. Process according to claim 1, wherein the elementary iron has a weight average particle size of at most 250 μm.

3. Process according to claim 1, wherein the elementary iron is added in the form of a masterbatch comprising finely dispersed elementary iron in a carrier polymer.

4. Process according to claim 3, wherein each of the carrier polymer and the thermoplastic polymer is a polyamide.

5. A moulding composition comprising a thermoplastic polymer as a continuous phase, a non-metallic fibrous reinforcing agent and a heat stabilizer in the form of finely dispersed elementary iron having a weight average particle size of at most 450 μm, wherein the elementary iron is present in the composition in an amount between 0.01 to 20 parts by weight (pbw) relative to 100 pbw of the thermoplastic polymer, and wherein the thermoplastic polymer is a semi-crystalline or crystalline polymer having a melting temperature of at least 180° C. or an amorphous polymer having a glass transition temperature of at least 180° C.

6. Composition according to claim 5, comprising
   a. 100 pbw thermoplastic polymer,
   b. 5-300 pbw non-metallic fibrous reinforcing agent,
   c. 0.01-20 pbw finely dispersed elementary iron, and
   d. 0-30 pbw of a carrier polymer.

7. Composition according to claim 5, wherein the composition further comprises at least a filler or another additive.

8. Composition according to claim 5, consisting of
   a. 94.95-29.95 mass % thermoplastic polymer,
   b. 5-70 mass % non-metallic fibrous reinforcing agent,
   c. 0.05-16 mass % finely dispersed elementary iron,
   d. 0-16 mass % a carrier polymer,
   e. 0-69.95 mass % inorganic filler and
   f. 0-16 mass % other additive, wherein
   the mass % are relative to the total mass of the composition, the total amount of (b+c+e) is at most 75 mass %, relative to the total mass of the composition, the total amount of (d+f) is at most 30 mass %, relative to the total amount of (a+d+f) and the total amount of (a+b+c+d+e+f) is equal to 100 mass %.

9. Composition according to claim 5, wherein the thermoplastic polymer is an aliphatic polyamide, having a HDT, measured according to ISO 75/A, of at least 220° C. and having a tensile strength and/or elongation at break, tested on a test bar with a thickness of 4 mm in a tensile test according to ISO 527 at 23° C., which is retained for at least 60% after heat-ageing for 800 hours at 215° C.

10. Composition according to claim 5, wherein the thermoplastic polymer is a semi-aromatic polyamide, having a HDT, measured according to ISO 75/A, of 250° C. or higher, and having a tensile strength and/or elongation at break, tested on a test bar with a thickness of 4 mm in a tensile test according to ISO 527 at 23° C., which is retained for at least 50% after heat-ageing for 800 hours at 230° C.

11. Composition according to claim 5, wherein the elementary iron is present in an amount between 5 to 10 pbw relative to 100 parts by weight of the thermoplastic polymer.

12. Moulded part comprising a composition according to claim 6.

13. Assembled article comprising a moulded part according to claim 12.

14. Electric or electronic installation comprising a moulded part according to claim 12.

15. A machine, engine, an electric or electronic installation comprising a moulded part according to claim 12.

16. Automotive vehicle, general transport means, domestic appliance, or general industry installation, comprising a moulded part according to claim 12.

17. Electric or electronic installation comprising an assembled article according to claim 13.

18. Automotive vehicle, general transport means, domestic appliance, or general industry installation, comprising a machine or engine according to claim 15.

* * * * *